United States Patent
Rose et al.

(10) Patent No.: US 6,686,711 B2
(45) Date of Patent: Feb. 3, 2004

(54) AIR MATTRESS CONTROL SYSTEM AND METHOD

(75) Inventors: Eric S. Rose, Easley, SC (US); David E. Karr, Greenville, SC (US); Ronald D. Cranford, Harrisburg, NC (US)

(73) Assignee: Comfortaire Corporation, Greenville, SC (US)

( * ) Notice: Subject to any disclaimer, the term of this patent is extended or adjusted under 35 U.S.C. 154(b) by 46 days.

(21) Appl. No.: 10/002,992

(22) Filed: Nov. 15, 2001

(65) Prior Publication Data

US 2002/0091467 A1 Jul. 11, 2002

Related U.S. Application Data

(60) Provisional application No. 60/249,054, filed on Nov. 15, 2000.

(51) Int. Cl.[7] .............................................. A47C 27/10
(52) U.S. Cl. .................................. 318/16; 5/713; 5/935
(58) Field of Search ........................... 5/706, 713, 935; 318/16

(56) References Cited

U.S. PATENT DOCUMENTS

| | | | | |
|---|---|---|---|---|
| 4,394,784 A | | 7/1983 | Swenson et al. ............... | 5/453 |
| 4,897,890 A | | 2/1990 | Walker ........................... | 5/453 |
| 5,003,654 A | * | 4/1991 | Vrzalik ........................... | 5/453 |
| 5,020,176 A | | 6/1991 | Dotson ........................... | 5/453 |
| 5,509,154 A | * | 4/1996 | Shafer et al. .................. | 5/453 |
| 5,652,484 A | | 7/1997 | Shafer et al. ................. | 318/16 |
| 5,794,288 A | | 8/1998 | Soltani et al. ................. | 5/713 |
| 5,815,864 A | * | 10/1998 | Sloop ............................ | 5/706 |
| 5,848,450 A | * | 12/1998 | Oexman et al. ............... | 5/713 |
| 5,905,941 A | | 5/1999 | Chanteau .................... | 455/3.2 |

* cited by examiner

*Primary Examiner*—Bentsu Ro
(74) *Attorney, Agent, or Firm*—McNair Law Firm, P.A.; Douglas W. Kim

(57) ABSTRACT

A method and system for controlling the firmness of an inflatable air mattress wherein an air blower supplies pressurized air to the inflatable chamber(s) of the mattress through a port containing a valve in response to a target fullness selected by the user, the blower operation being controlled by a processor having an array of blower speeds included in a computer readable medium blower so that the speeds are selected in response to the target value.

22 Claims, 9 Drawing Sheets

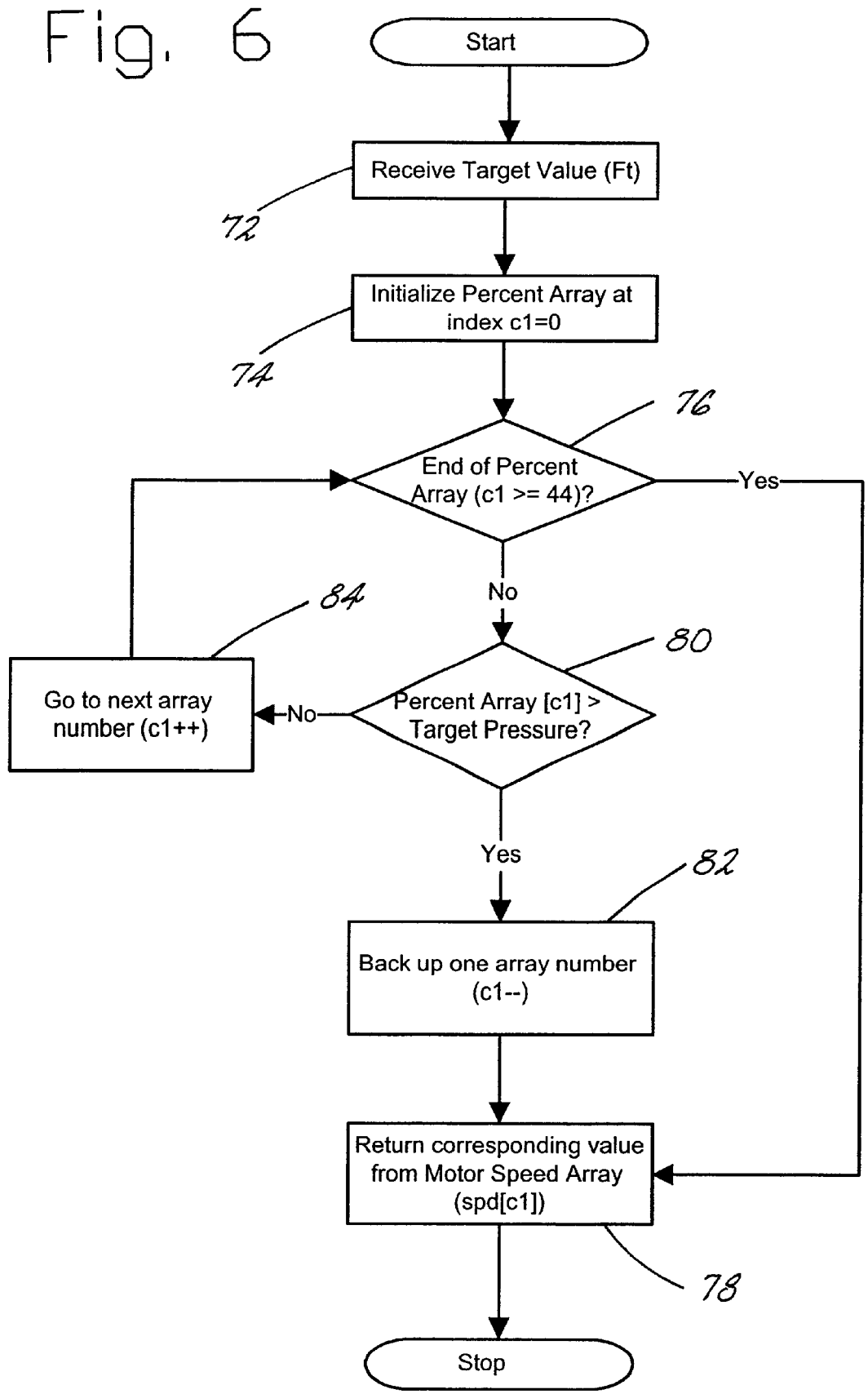

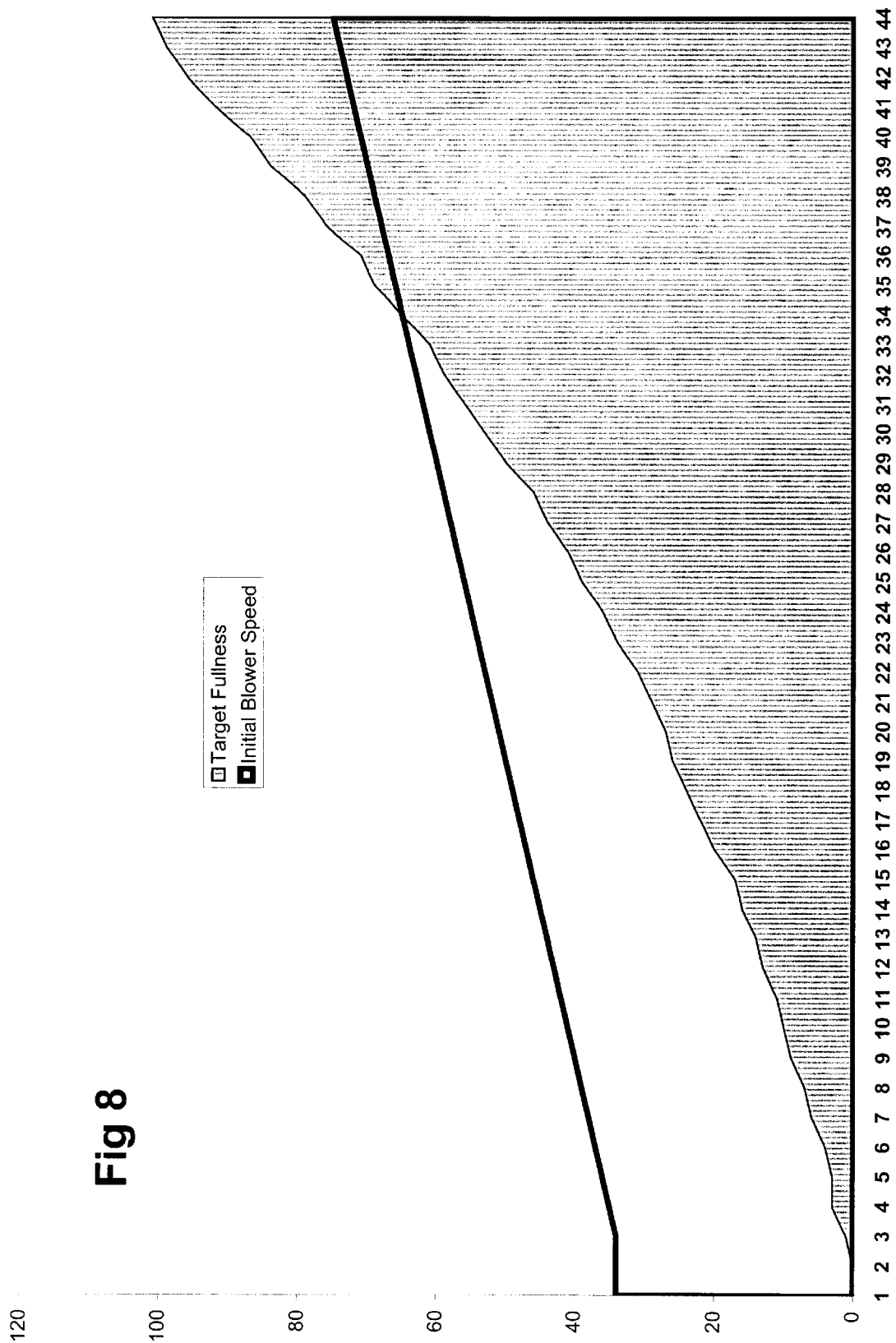

AIR MATTRESS CONTROL SYSTEM AND METHOD

FIELD OF THE INVENTION

This invention relates to a system and method for controlling the inflation/deflation of an air chamber. More specifically, the invention relates to a control system and method which automatically re-calculates indexed motor speeds needed to reach fullness conditions depending on the size of the air chamber. This application claims the benefit of provisional patent application Ser. No. 60/249,054 filed Nov. 15, 2000.

BACKGROUND OF THE INVENTION

Air mattresses have been traditionally provided as a cushioning means for sleepers using cots, sleeping bags, or other body supports. Recently, the air mattress has begun to replace the traditional residential mattress which uses coils and springs. Much popularity has arisen in the home mattress market for a residential mattress having an air chamber for supporting the sleeper. The typical air mattress includes at least one air chamber and an inflation and deflation means. Such means for inflation and deflation range from hand pumps and blowers to computerized air control systems. The utilization of an air chamber provides a sleeping surface which can have varying levels of firmness to suit the preferences or needs of the sleeper with the use of two air chambers. The left and right sides of a bed can be set to maintain two different sleeping surface conditions to accommodate the specific preferences of each sleeper. For example, one sleeper may prefer a sleeping surface which is firm while the other may prefer a surface that is soft. Dual chambers allow for the accommodation of both sleepers.

Air chambers are available in many sizes, for example, a double mattress, a queen, and a king. In each mattress, whether single or double chambers, the volume of fluid per chamber is significantly different. As such, the amount of time required to inflate the mattress would vary as the number of attempts an air system takes to hit a desired fullness would vary. Development of an air system to consistently reproduce a sleep surface condition regardless of air chamber size is a matter to which significant attention needs to be directed. Additionally, an air chamber which inflates at a given interval with a consistent inflation time, regardless of air chamber size, is needed.

Although attempts have been made to produce consistent sleep surfaces with fixed inflation times, none have considered the variation in air mattresses sizes. These previous methods of controlling a pump or blower all contain significant disadvantages. Those employing a static look-up table to associate settings with pressure do not adjust for various mattress sizes. For example, these systems may require five minutes to fill a double mattress from empty to full, but, pressured the same, the difference for a king sizes mattress may be ten minutes.

While several air systems exist, none are self-calibrating, self-learning air systems that can accurately repeat a sleeping surface regardless of the air chamber. Also, none are able to inflate to the same fullness for a fixed time interval regardless of air chamber size.

An example of an air mattresses which is not self-calibrating is illustrated in U.S. Pat. No. 5,652,484. This patent discloses an automatic control system for controlling the pressure of an air mattress. A base processor controls the speed and time the blower runs for inflation. However, the processor calculates the time for running the blower each and every time the blower needs to run. This calculation does not consider air chamber size nor contains "learning" from inaccurate calculations.

The invention of U.S. Pat. No. 4,897,890 discloses an air control system for an air bed which utilizes an air pump having a diaphragm. The pump is directly controlled through buttons depressed by a user of the control system. No self-calibrations are made concerning the length of time nor the speed in which to run the pump.

Other examples of air control systems which do not contain means for self-calibration include U.S. Pat. Nos. 4,394,784; 5,020,176; and 5,794,288.

Accordingly, an object of the present invention is to provide for an air mattress and air mattress control system for dynamically calculating the blower speed to provide fixed inflation times regardless of the mattress size.

Another object of the present invention is to provide an air system able to accurately replicate a prescribed sleep surface within a preselected period of time regardless of mattress size.

SUMMARY OF THE INVENTION

The foregoing and other objects are achieved by our invention which, in one aspect, is a system for controlling the inflation and deflation of an air chamber of an air mattress which comprises a system processor with a computer readable medium, an air blower whose speed is controlled by the processor, a supply port carried by the blower through which air is delivered to the chamber, a remote control for generating a command signal to the processor representing a desired degree of fullness of said air chamber; and a set of processing instructions within said readable medium responsive to a command signal so that responsive to said command signal, the processor executes instructions for retrieving a blower speed from an array of speeds, and retrieves a first adjustment value to the blower speed, adjusts the blower speed based on said adjustment value, and operating said blower at the adjusted blower speed. By controlling the degree or level of inflation or fullness of the mattress chamber the sleeping surface can be automatically adjusted to provide maximum comfort to the sleeper or user.

In another aspect, the present invention is an air mattress control system for controlling the inflation and deflation of an air chamber of an air mattress to provide a desired air chamber fullness having a system processor with a computer readable medium, an air blower operably connected to said computer readable medium which is operably connected to the system processor, and a supply line in fluid communication with the air chamber for inflating and deflating said air chamber comprising a remote control having a computer readable medium including a memory area, a numeric value stored in said memory area representing the desired fullness of the air chamber selected by a user, a plurality of control buttons carried by said remote control operably connected to said computer readable medium of said remote control, a set of remote control instructions contained within said computer readable medium of said remote control for, responsive to the depression of at least one of said control buttons, incrementing said numeric value to said system processor, a motor speed array indexed by desired fullness values, and, a set of processing instructions contained in said computer readable medium of said system processor for, in response to receiving said numeric value from said system processor, selecting a motor speed from said motor speed array, adjusting said selected motor speed, calculating a motor speed run time, and operating said motor speed at said adjusted motor speed for said calculated time.

In yet another aspect, the invention, is an improved method for controlling the fullness of an air mattress having at least one inflatable chamber and a means for generating a pressurized flow of air to the chamber through a supply port, the supply port including a value for admitting and removing air from said chamber, the chamber including a pressure sensor for measuring chamber fullness and the improvement comprises the steps of providing a multi-speed air blower as the means for generating pressurized air flow, the operating speed of said blower being selected from an array of discrete, incremented blower speeds, said speeds in said array being a predetermined function of chamber size and time to reach a designated percentage of fullness; a target value being a percentage of fullness; comparing the target value with the current level of chamber fullness measured by said sensor and determining the differential percentage, selecting a blower speed from an array corresponding to said differential percentage operating the blower at said selected speed, opening said valve to introduce pressurized air into said chamber through said valve, again determining the percentage of fullness measure by said sensor, and determining a new differential percentage; selecting a new blower speed based on the new differential, and operating the blower at the new speed to introduce air into the chamber, repeating the previous four steps until said target value is substantially reached whereupon said value is closed.

The pumps, valves, connectors, controllers, chambers, and other equipment mentioned herein is readily obtainable by those skilled in the art who, using this specification as a guide, can purchase and assemble the same.

DESCRIPTION OF THE DRAWINGS

The invention will be more readily understood from a reading of the following specification and by reference to the accompanying drawings forming a part thereof, wherein an example of the invention is shown and wherein:

FIG. 6 is a flow chart of the "fuzzy logic" for the motor speed;

FIG. 8 is a graph showing the mathematical relationship exists between the target fullness and the proper motor speed.

DESCRIPTION OF A PREFERRED EMBODIMENT

Figure 1:
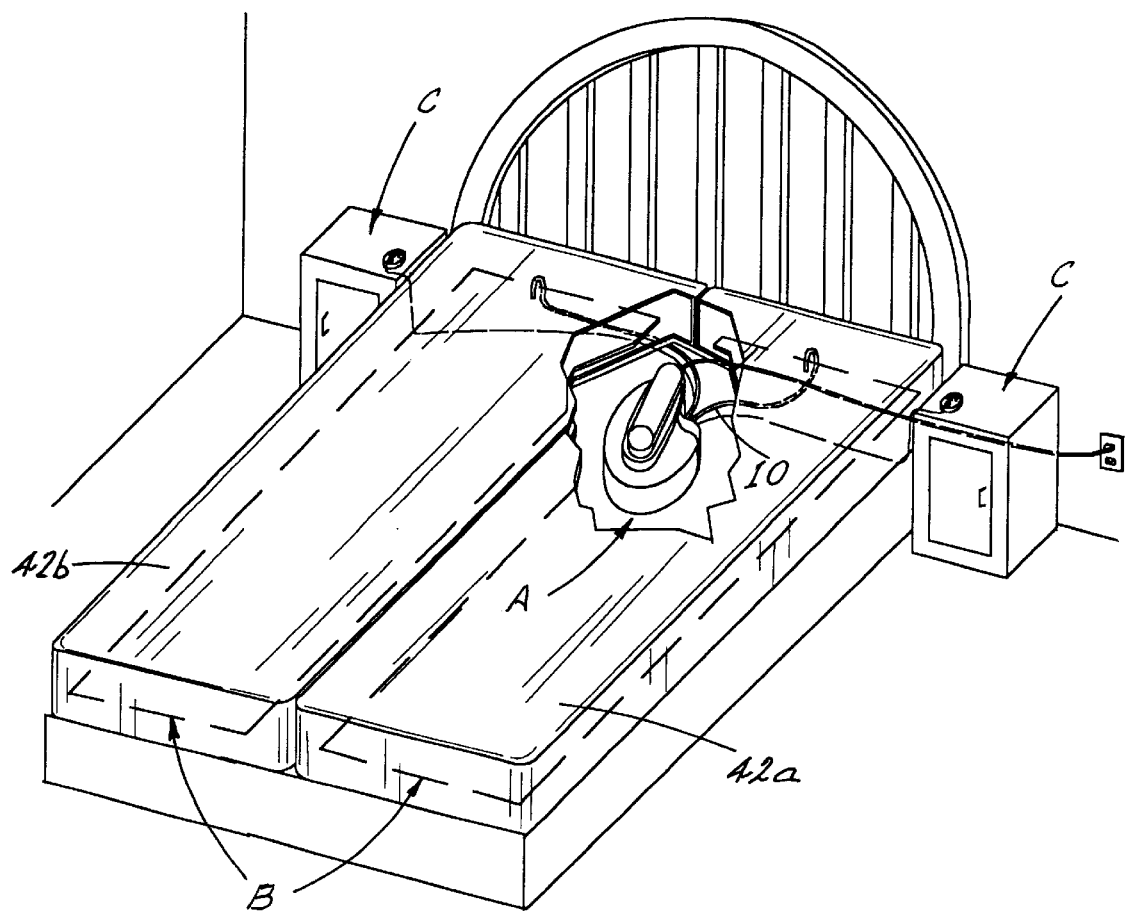
FIG. 1 is a perspective view showing the air chambers, air system, and remote unit of one embodiment of the invention.

Reviewing FIG. 1, the air system designated generally as A can be seen placed underneath the air mattresses, designated generally as B, with a set of remote units, designated generally as C, all connected to the air system. Fluid is transported between air system A and air mattresses B through supply tube 10. It should be noted that multiple supply tubes to multiple air chambers are possible given the various size of mattresses. For example, a twin bed may only require a single air chamber while a king bed may require two or more chambers. FIG. 1 illustrates a mattress with two chambers.

Figure 2:
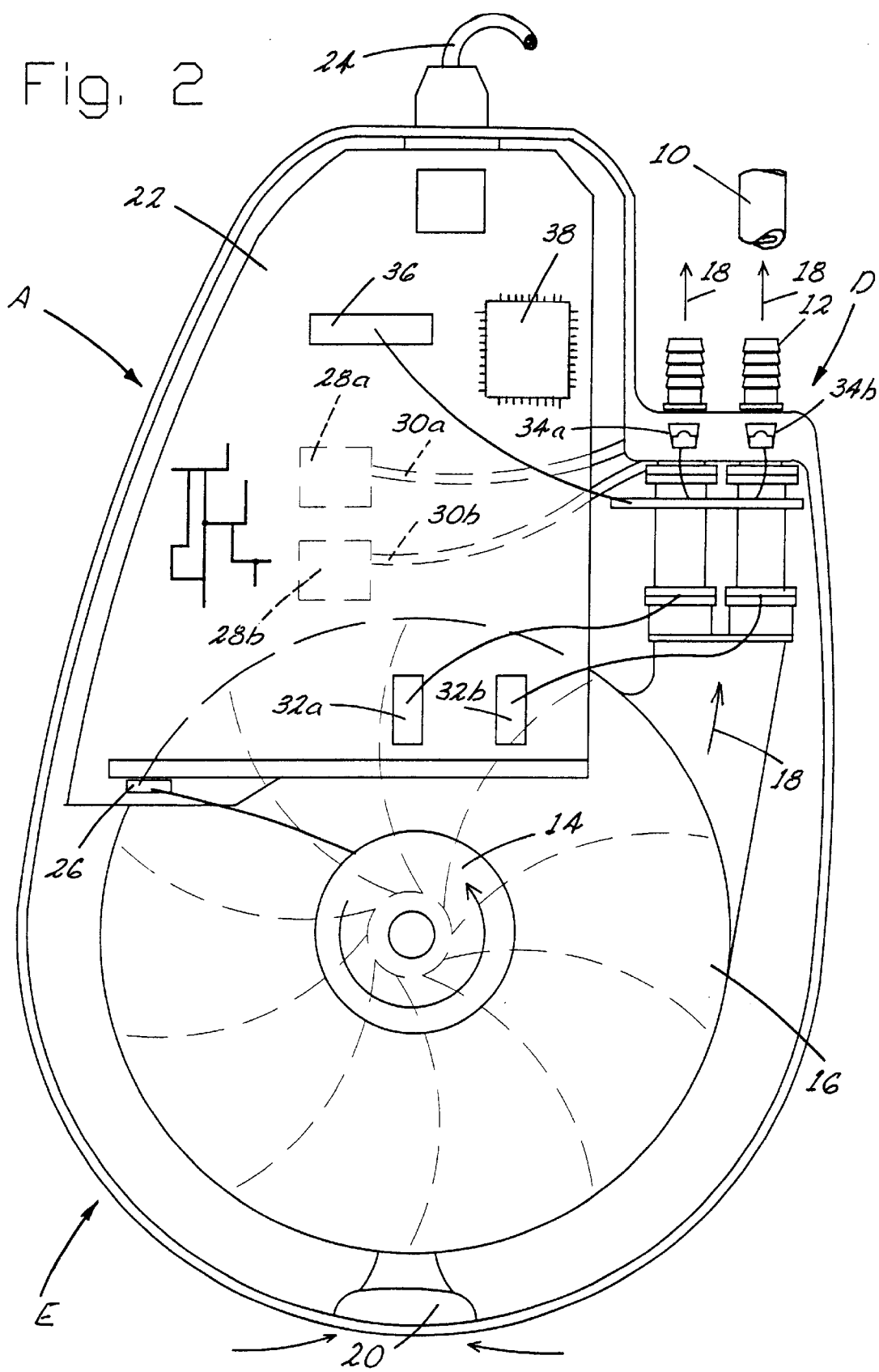
FIG. 2 is a top view of the air system of FIG. 1.

Referring now to FIG. 2, the air system A will be explained in more detail. Air supply 10 is connected to a port 12 of valve assembly D. In this particular embodiment, dual valve assemblies are shown to support a dual chamber mattress. For inflation, blower engine 14 is connected to fan 16 which provides air flow in a direction designated as 18 for delivery to the air chamber. The air delivered to the air chamber is provided by an intake 20 contained within the air system A. It should be noted that while air is the fluid of the preferred embodiment, other fluids may certainly be used. Also contained within air system A is a processor 22 which is supplied power through power cord 24. Blower engine 14 is connected to processor 22 through connection 26 so that processor 22 can control the speed and duration for which the blower engine operates. Fullness sensors 28a and 28b are also located on processor board 22 and are connected to valve assembly D through tubes 30a and 30b. This allows the fullness sensors to be able to read fullness from the air chambers. The valve assemblies are also connected to processor port 22 through connections 32a and 32b. This connection allows processor 22 to control the opening and closing of the valves contained within the valve assembly D.

Remote units designated generally as C (FIG. 1) are connected to air system A through twisted-pair cabling utilizing RJ11 jacks 34a and 34b. These jacks provide a connection to processor board 22 through remote unit connection 36. This connection allows the remote units to communicate with the air system and specifically with processor 22.

Contained within processor 22 is controller 38 containing a computer readable medium for storing computer readable code for the operation of processor 22 and air system A. The computer executable code residing on controller 38 will be described later in more detail.

Figure 3:
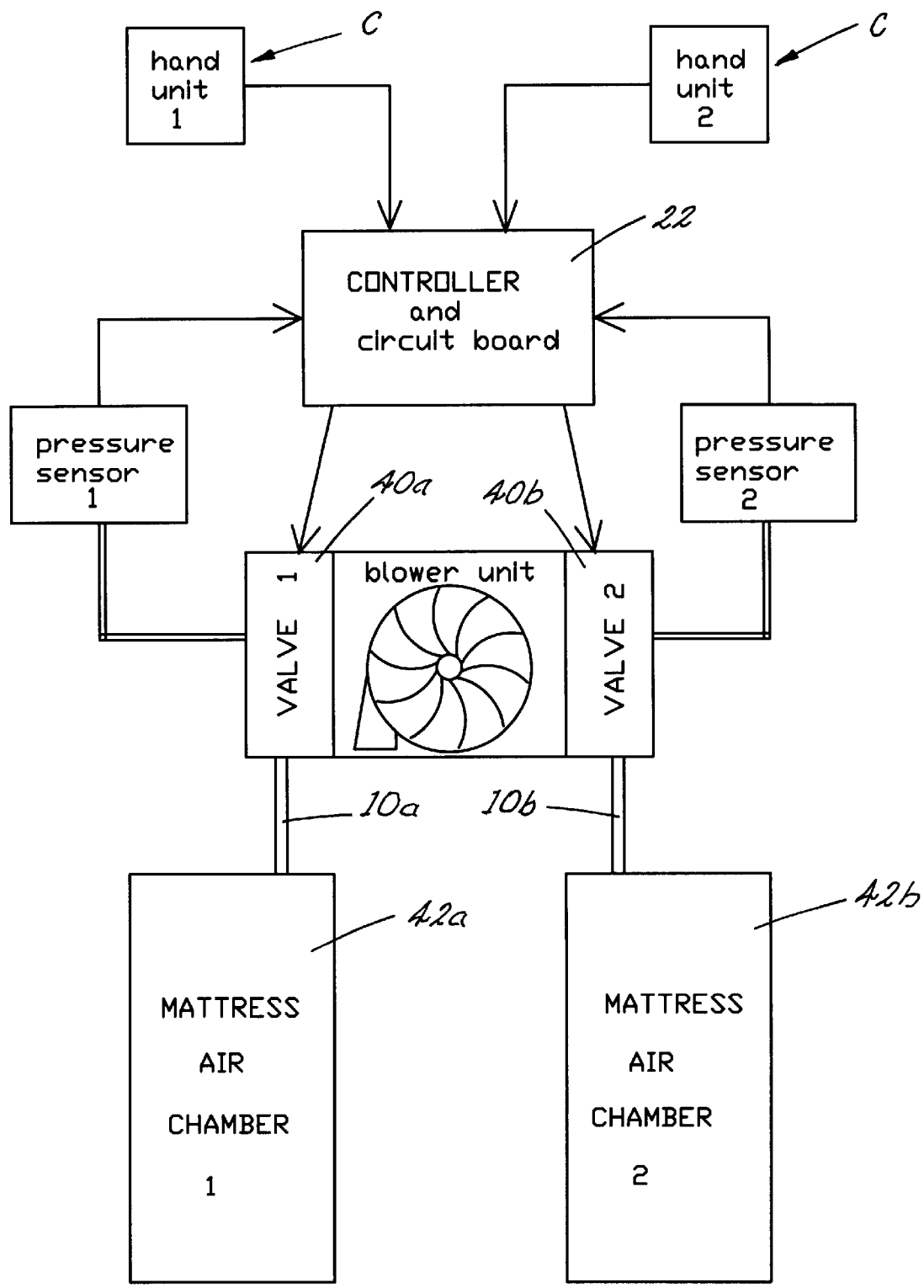
FIG. 3 is a schematic view of the air system of the invention.

Referring to FIG. 3, air system A is described in further detail. Remote controllers C are connected to processor 22 for transmitting user command signals to processor 22 and subsequently to controller 38. Processor 22 controls valves 40a and 40b of valve assembly D to allow fluid to flow from the blower through valves 40a and 40b, through supply tubes 10a and 10b to inflate air mattresses 42a and 42b. Additionally, fluid from the air mattress flows through the supply tube, through valves 40a and 40b and exits through vent 20 (FIG. 2).

Figure 4:
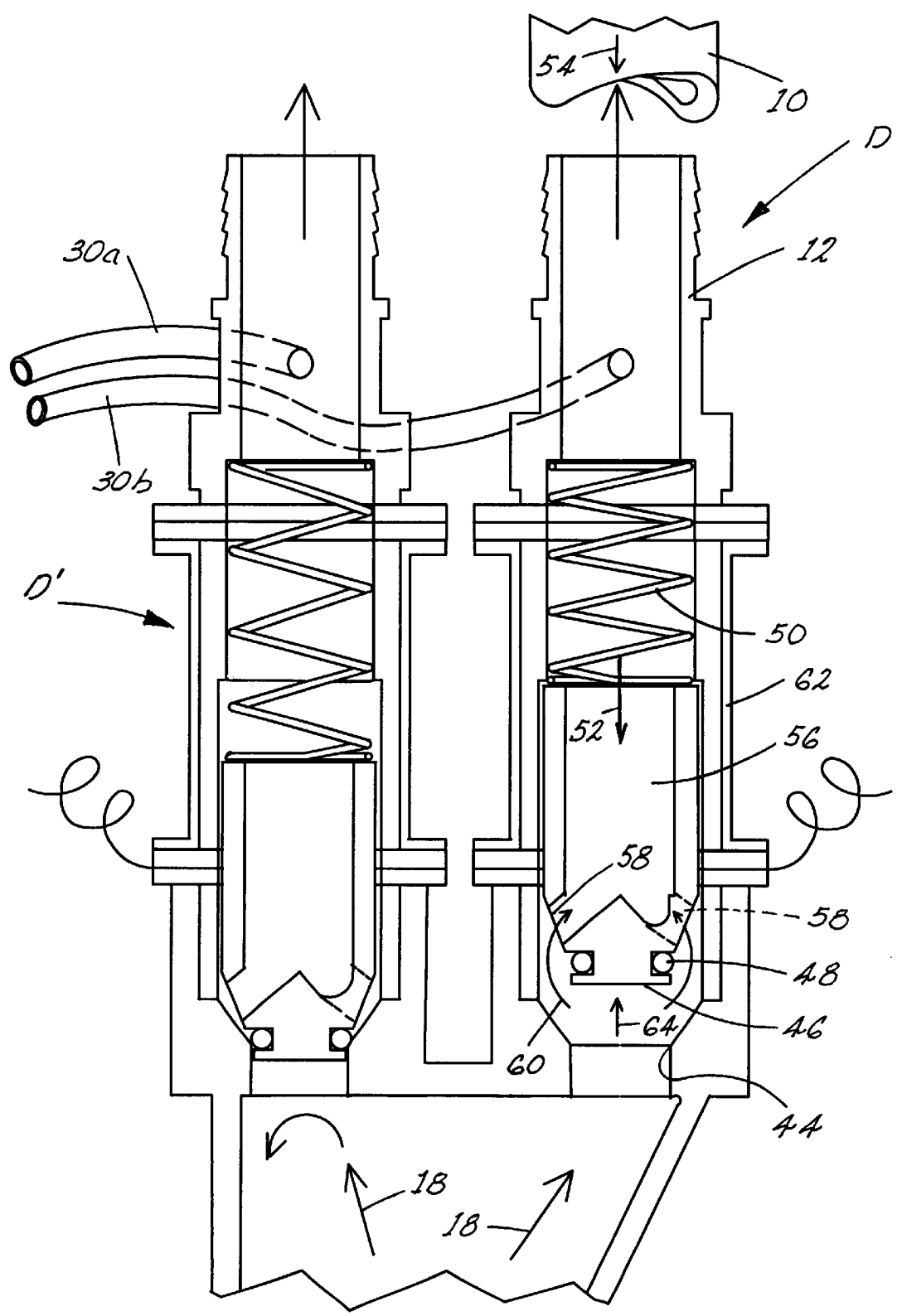
FIG. 4 is a cutaway view of the valve assembly D of FIG. 1.

Valve assembly D is further illustrated in FIG. 4 which shows a valve assembly for the dual chamber embodiment. During the inflation process the air blower produces air flow in direction 18. Valve assembly D contains valve seat 44 for receiving valve head 46 so that when O-ring 48 carried by valve head 46 contacts valve seat 44 air flow is prevented. Spring 50 applies pressure in direction 52 to force valve head 46 and O-ring 48 to valve seat 44. Additionally, an advantage of this design is to provide for fluid pressure of the air mattress to exert the pressure in direction 54 through delivery tube 10 to force valve stem 56 in direction 52 to create a tighter seal between the valve head, O-ring, and valve seat. Simply put, the pressure keeping the valve closed is related to the amount of pressure in the air chamber. The left valve assembly D illustrates the valve in the closed position. When the valve is open, valve ports 58 allow for air flow in direction 60 to flow around O-ring 48, through valve stem 56, through port 12, and through supply hose 10 into the air chamber. In the preferred embodiment, solenoid 62 is connected to processor 22 through connections 32a and 32b (FIG. 2). When energized, solenoid 62 applies a magnetic force to valve stem 56 to pull valve head and O-ring away from valve seat in direction 64 thereby allowing air flow in direction 18 when the blower is on, and allowing for air flow to escape the air mattress in the direction 54 when the blower is off. The pressure contained in the air mattress is transmitted through pressure tubes 30a and 30b respectively to pressure sensor 28a and 28b (FIG. 2) from port 12. It is advantageous to close the valve when checking pressure in order to avoid any potential discrepancies caused by fluid movement in the direction 18 through the blower.

Function of the Air System

Figure 5A:
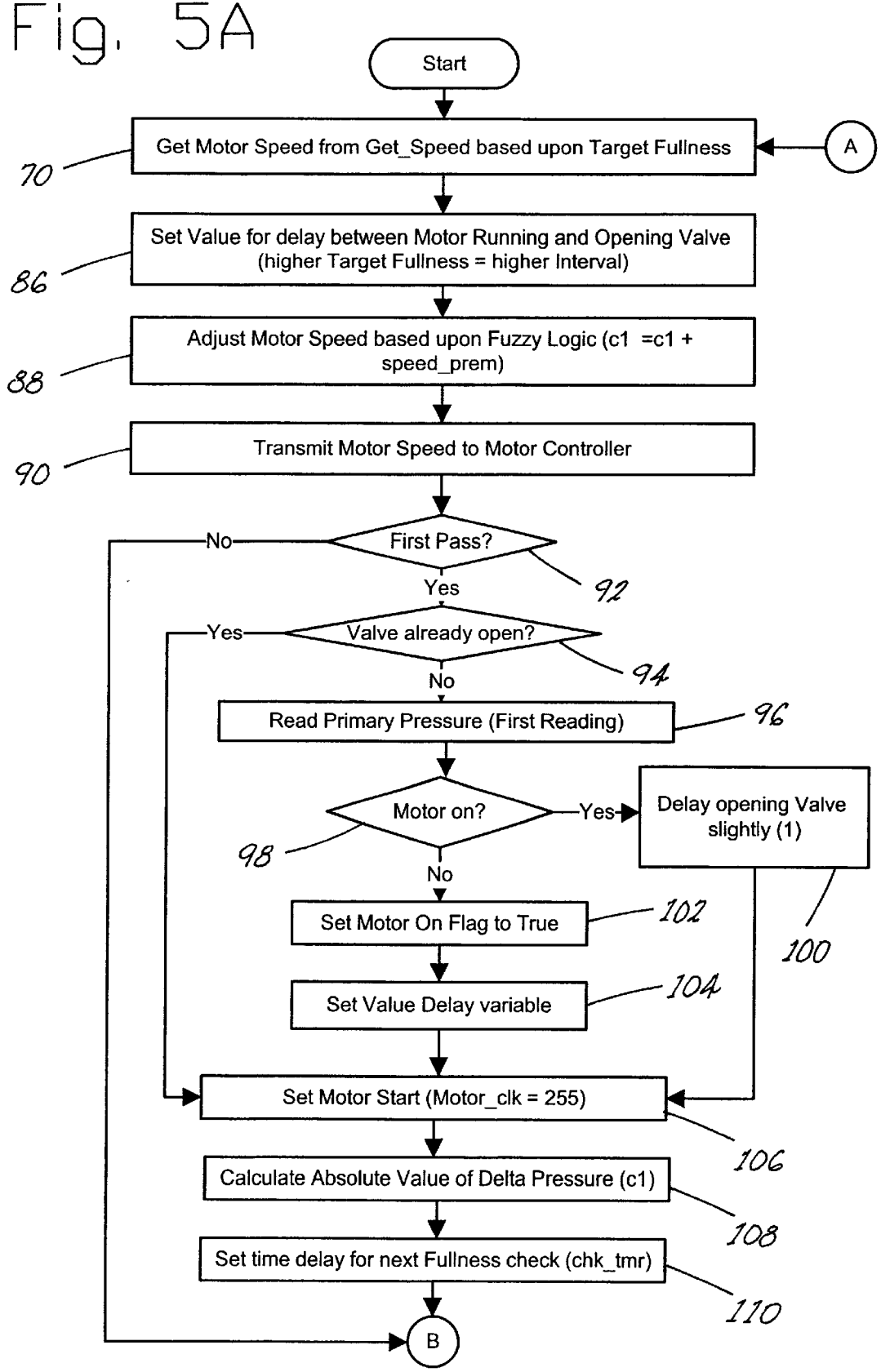
FIG. 5A is a flow chart of the "fuzzy logic" for the invention from the "start;" to the "B" position.

Referring now to FIG. 5A, the software embedded in a computer readable medium of processor 22 will be described in further detail. Step 70 depicts the calculation of the initial motor speed in which to run the motor. This calculation is based upon the target fullness. In calculating the initial motor speed, a mathematical relationship exists between the target fullness and the proper motor speed. This relationship is represented by the graph shown in FIG. 8.

As illustrated in the graph of FIG. 8, the X-axis represents a mutual index between the Target Fullness and Initial Blower Speed and the Y axis represent the target fullness as a percentage. As illustrated, the Target Fullness is a logarithm progression when compared to the linear progression of the Initial Speed. By relating the motor speed to the Target Fullness in this logarithmic manner, the opposite initial motor speed is calculated. It should be noted that the speed represented in the graph is representative of motor speed and the actual data transmitted to the blower is inverse. Therefore, the higher a number transmitted to the blower, the slower the motor speed.

FIG. 6 illustrates the motor speed in more detail. Step 72 of FIG. 6 represents receiving the target fullness $F_t$ from the remote C. The target fullness is used to index an estimated target array in step 74. In the present embodiment 44 values are used to relate the estimated target with the initial speed. If the target value exceeds the estimated values of the array, as checked in step 76, the motor speed is returned as the last and fastest speed in the array in step 78. Otherwise, if the estimated target value is greater than the target fullness, as checked in step 80, the array index number is reduced by one in step 82. Otherwise, the next set of values are checked in step 84. The end result of this function is to provide for an initial blower speed having a relationship with the target pressure so as to provide a blower speed sufficient to inflate the mattress based upon the target speed and ultimately the desired sleeping surface.

Once the initial motor speed is selected through the target motor speed function, the delay is set between ramping up the motor and opening the valve in step 86 (FIG. 5A). The higher the target pressure, the higher the interval between ramp up speed and opening the valve since the higher the target pressure requires the higher motor speed which requires a longer ramp up time. In step 88, the initial motor speed is adjusted based upon fuzzy logic employed to either increment or decrement the speed in which to run the motor. Fuzzy logic is the logic used so that the motor speed used to inflate the mattress based upon the target fullness and pressure deferential between the present fullness and target fullness is adjusted per mattress size and environment. For example, to go from a fullness of 50 to 75 is a target pressure of 75 with a pressure differential of 25. Given a constant motor speed, a twin mattress would take less time to inflate than a queen. Therefore, the fuzzy logic allows the air controller to "learn" the correct blower speed so that either mattress would inflate at a consistent period of time. The twin would take five seconds since the air controller uses different speeds relative to the different size mattresses.

Additionally, the fuzzy logic is responsive to varying environmental conditions for the mattress. Based upon the well known physics principal, a change in temperature causes a change in a pressure of a gas given a constant volume. Since the air system of the present invention consistently adjusts motor speed through its fuzzy logic, the air system can self-calibrate for changes in temperature of the air mattress and maintain a consistent fullness and sleep surface irrespective of environmental conditions. To accomplish its goals, the Fuzzy logic functions use the history of previous inflation speeds and number of tries to determine whether the speed was sufficient to fill the mattress on the first try. Therefore, the fuzzy logic has been able to learn the proper motor speed in order to inflate the mattress within a specified time regardless of the size of the air mattress. The ultimate goal is to eliminate the fullness differential between the starting fullness with the target fullness. Once this motor speed is adjusted, it is transmitted to the motor controller of processor 22 in step 90. Next, the determination is made on whether this is the first attempt to inflate the mattress in step 92 and, if it is, the next step is to check whether the valve is already open in step 94. If the valve is not open, the current fullness is read in step 96 and a determination is made on whether the motor is already running in step 98. If the motor is already running, then the delay is set for opening the valve in step 100. If the motor is not on the motor is turned on in step 102 and the value delay between the motor ramping up and the valve opening is set in step 104. The motor start clock is set in step 106 so that the motor will not run indefinitely but rather will time out if the target fullness is not reached within a specified period of time. In step 108, the difference between the target fullness and the actual pressure is calculated and, based upon this spacing, the time is set in which to next check the fullness differential in step 110.

Figure 5B:
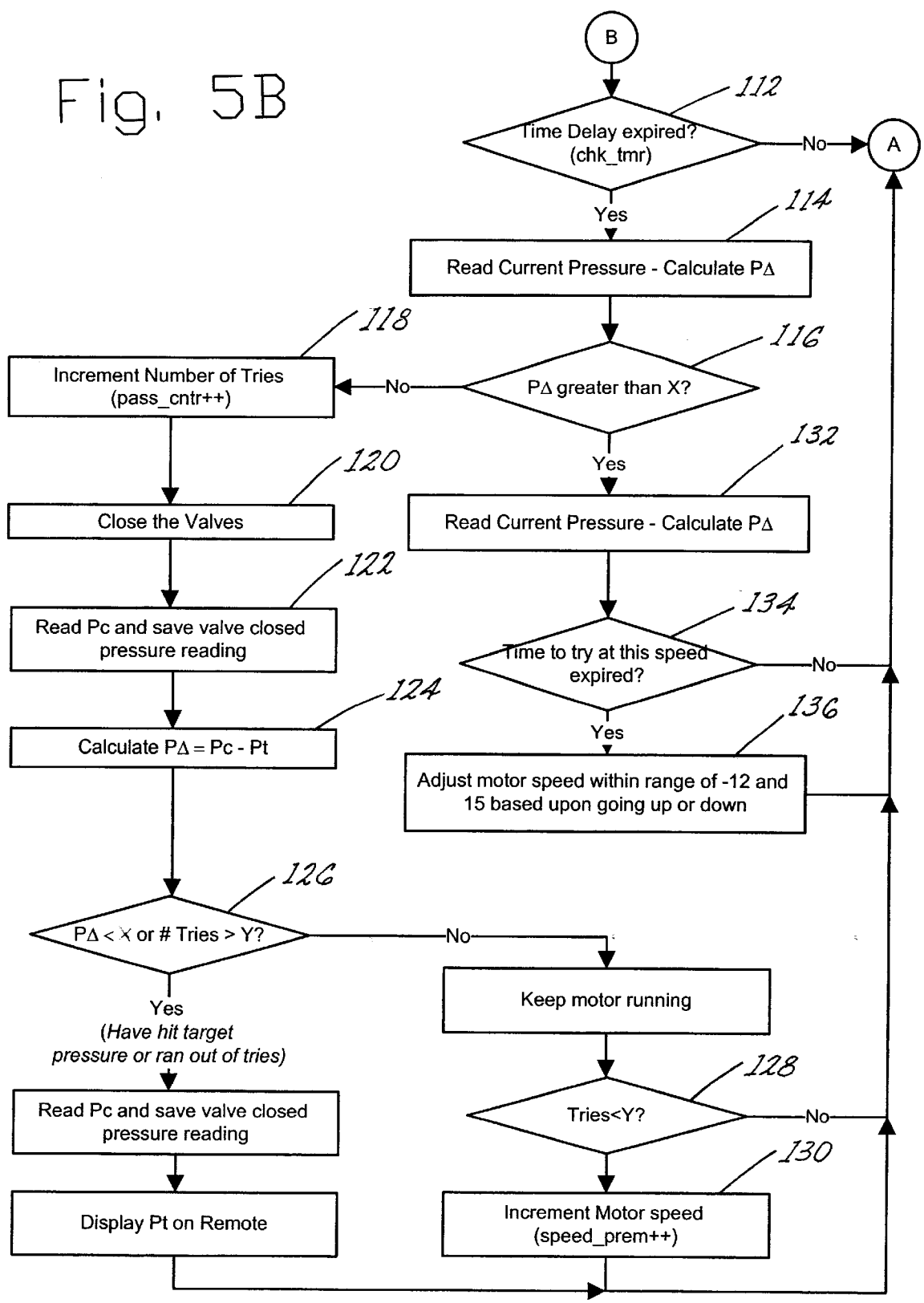
FIG. 5B is a continuation of the flow chart of the "fuzzy logic" from position "B" to position "A"

Continuing on to FIG. 5B, the check is then made as to whether the time has expired in which to check the fullness in step 112. If the time has expired, the current fullness is read. This represents the first try.

Next, the determination on whether the fullness differential is greater than a certain tolerance in step 116. For example, if the difference in the target fullness and the actual pressure is less than 3%, this may be an acceptable differential so that the air chamber is considered having reached the target fullness. Therefore, a mathematical equivalent between the target pressure and the actual fullness is not necessary but rather only that the actual pressure is within an allowable range for target fullness. Then the counter representing the number of attempts to reach the target fullness is incremented in step 118 the valves are closed in step 120 and the actual fullness is read in step 122. The fullness differential is calculated in step 124 and the determination is made on whether the actual fullness is within the specified range of the target fullness or the number of tries has exceeded a predetermined number in step 126. If neither condition is true, the motor is kept on and in step 128, the fuzzy logic increments the motor speed by one speed setting since the motor speed was insufficient to reach the target pressure within the first try. The process then begins again at step 70.

Were the actual fullness to have exceeded the target fullness, the motor speed would have been decremented.

Returning to step 116, if the actual fullness is within the tolerable range of the target fullness then the current fullness is read in step 132 and if the time to try at this particular speed has expired, as checked in step 134, the motor speed is adjusted based on the fuzzy logic in step 136 and the process is repeated back to step 70.

Figure 7:
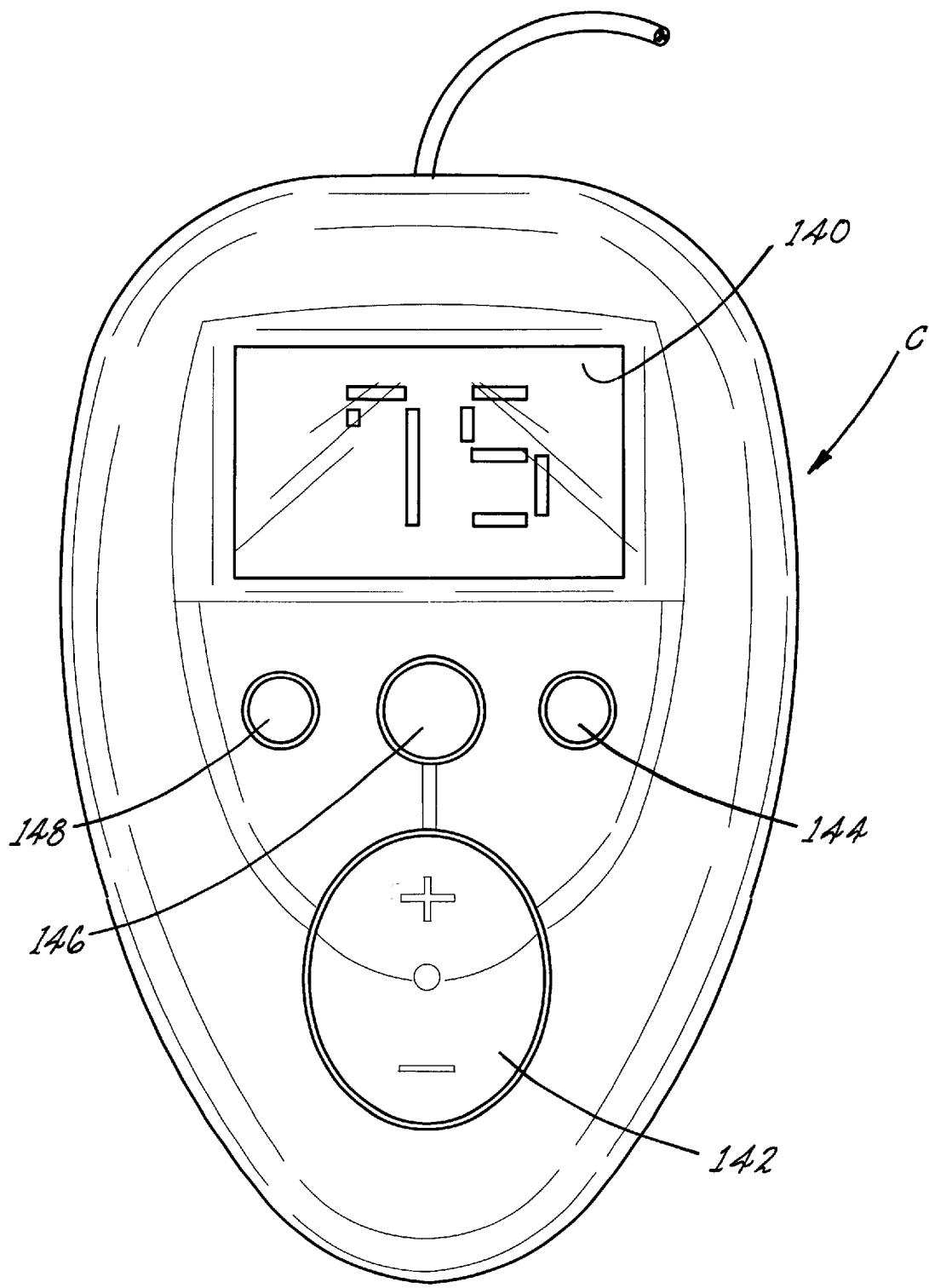
FIG. 7 is a top view of a remote unit for the invention.

FIG. 7 represents the remote unit attached to the air controller for transmitting the target fullness or manually operating the air blower and valve. Remote unit C contains display 140 for representing the actual fullness or target fullness based upon the mode in which the remote unit is operating. Input button 142 performs several features based upon the mode in which the handheld is operating. In automatic mode, the input button increments and decrements the target fullness as displayed on display 140. In manual mode, the plus runs the blower and inflates the mattress while the minus opens the valve to deflate the mattress. A "100" button 144 allows for the single operation of filling the mattress to 100%. Mode button 146 determines in which mode the handheld is operating. Modes which are possible are automatic mode, manual mode, and dual chamber mode. Automatic mode is where the remote control unit transmits a target fullness to the air system for inflation or deflation of the air chamber to the desired fullness. Manual mode is for opening the valve or running the blower responsive to the plus and minus button. Dual chamber mode inflates or deflates multiple air chambers with a remote unit. Additionally, memory button 148 can be used to reach a particular target at a touch of a button other than the 100% setting of button 144. To perform these operations, remote unit C also contains a processor computer readable medium and computer executable code for the application.

While a preferred embodiment of the invention has been described using specific terms, such description is for illustrative purposes only, and it is to be understood that changes and variations may be made without departing from the spirit or scope of the following claims.

What is claimed is:

1. An air system for controlling the inflation and deflation of an air chamber of an air mattress to provide a desired air chamber fullness comprising:
   a system processor having a computer readable medium;
   an air blower operably connected to said system processor so that said system processor controls the speed of said air blower;
   said readable medium including an array of retrievable blower speeds;
   an air supply port carried by said air blower through which the flow of air is directed and through which air is delivered to the air chamber;
   a remote control connected to said system processor for generating a command signal to said processor representing a desired level of fullness; and,
   a set of processing instructions contained within said computer readable medium so that, responsive to said command signal, said system processor executes said instructions for retrieving an air blower speed from said array of blower speeds, and retrieves a first adjustment value to said air blower speed, adjusts said air blower speed based upon said adjustment value, and operates said air blower at the adjusted motor speed.

2. The system of claim 1 further comprising:
   a valve assembly carried in fluid communication with said air supply port;
   said valve assembly having an open position for allowing air flow through said supply port and a closed position for preventing air flow from passing through said supply port;
   said set of processing instructions responsive to receiving said command signal and including instructions for opening said valve assembly; and,
   said valve assembly operatively connected to said system processor so that said system processor controls said valve assembly.

3. The system of claim 2 wherein said set of processing instructions includes instructions for opening said valve assembly after said air blower has reached a predetermined speed.

4. The system of claim 1 further comprising:
   a sensor disposed in fluid communication with the air chamber and operatively connected to said processor for sensing the fullness of the air chamber and for generating a sensor signal; and,
   said set of processing instructions, responsive to receiving said sensor signal, includes instructions for stopping said air blower if the fullness represented by said sensor signal and the fullness represented by said command signal are within a prescribed tolerance.

5. The system of claim 4 wherein said set of processing instructions includes instructions for calculating a second adjustment value based upon a differential location between said fullness represented by said sensor signal and said fullness represented by said command signal.

6. The system of claim 4 wherein said set of processing instructions include instructions for closing said valve assembly prior to generating said sensor signal.

7. The system of claim 4 wherein said set of processor instructions includes instructions for only receiving said sensor signal at a predetermined time interval.

8. The system of claim 4 wherein said set of processor instructions includes instructions for repeating said set of instructions a prescribed number of times in response to said command signal.

9. The system of claim 1 wherein said valve assembly includes:
   a valve having a first side operatively associated with said supply port and a second side associated with the air chamber;
   a plunger included in said valve; a plunger seat included in said valve oriented toward said first side;
   said valve having a closed position in which said plunger engages said plunger seat so that air pressure from said air chamber is applied to said plunger forcing said plunger onto said plunger seat forming a tight seal and said valve having an open position wherein air pressure applied from said blower forces said plunger away from said plunger seat for allowing said plunger to more freely move away from said plunger seat for delivery of air to the air chamber.

10. An air mattress control system for controlling the inflation and deflation of an air chamber of an air mattress to provide a desired air chamber fullness having a system processor with a computer readable medium, an air blower operably connected to said computer readable medium which is operably connected to the system processor, and a supply line in fluid communication with the air chamber for inflating and deflating said air chamber comprising:
   a remote control having a computer readable medium including a memory area;
   a numeric value stored in said memory area representing the desired fullness of the air chamber selected by a user;

a plurality of control buttons carried by said remote control operably connected to said computer readable medium of said remote control;

a set of remote control instructions contained within said computer readable medium of said remote control for, responsive to the depression of at least one of said control buttons, incrementing said numeric value to said system processor;

a motor speed array indexed by desired fullness values; and, a set of processing instructions contained in said computer readable medium of said system processor for, in response to receiving said numeric value from said system processor, selecting a motor speed from said motor speed array, adjusting said selected motor speed, calculating a motor speed run time, and operating said motor speed at said adjusted motor speed for said calculated time.

11. The system of claim 10 including:

a valve assembly carried by said air blower operatively connected to said system processor and having an opened position and a closed position; and, said set of processing instructions including instructions for opening said valve assembly in response to receiving said numeric value from said remote control for allowing air flow into the air chamber.

12. The system of claim 11 including:

a sensor operatively connected to the system processor and in fluid communication with the air chamber for sensing the fullness of the air chamber and for generating a sensor signal; and, said set of processing instructions including instruction responsive to said sensor signal for stopping said air blower if the fullness represented by said sensor signal and the fullness represented by said numeric value are within a predetermined tolerance.

13. The system of claim 12 wherein said processing instructions include instruction for only receiving said sensor signal at a predetermined time interval.

14. The system of claim 12 wherein said processing instructions include instruction for repeating said set of processing instructions a prescribed number of times in response to receiving said numeric value.

15. A set of computer readable instructions for operating an air system for controlling the inflation of an air mattress wherein the air system includes a system processor, an air blower, a sensor for sensing fullness of the air chamber and generating a sensor value, a valve for controlling air flow, and a computer readable medium for containing the set of computer readable instructions comprising:

a motor speed array corresponding to operating motor speeds of the air blower;

input instructions for receiving a target value corresponding to a user's request for a specific fullness and sensor values corresponding to the air mattress' current fullness;

operating instructions for selecting an initial motor speed in response to said target value and for calculating a blower run time from the differential between the target value and a first sensor value, and for operating said air blower at said selected motor speed for said calculated blower run time, and for opening the valve to allow for inflation;

comparative instructions for receiving a second sensor value comparing said target value with said second sensor value and stopping the air blower and closing the valve if said target value and said second sensor value are within a predetermined tolerance; and, adjustment instructions for determining a delta value between said target value and said second sensor value upon completion of said operating instructions, calculating a motor speed adjustment value based upon said delta value, and storing said motor speed adjustment value in said computer readable medium.

16. The computer readable instructions of claim 15 wherein said operating instructions includes instructions for retrieving said motor speed adjustment value and adjusting said selected motor speed by said motor speed adjustment valve prior to starting the air blower.

17. The computer readable instructions of claim 15 including instructions for repeating said operating instructions and said comparative instructions.

18. The computer readable instructions of claim 15 wherein said operating instructions include instruction for opening the valve after a prescribed period of time from when the air blower begins to operate.

19. The computer readable instructions of claim 15 wherein said comparative instructions include instruction for closing the valve prior to receiving said second sensor value and opening the valve if said target value and said second sensor value are not within a predetermined tolerance.

20. A computerized air mattress control system for controlling the inflation of an air chamber of an air mattress comprising:

an air chamber;

a system processor with a computer readable medium;

an air blower operatively connected to said system processor and in fluid communication with said air chamber for providing air flow to said air chamber;

a valve assembly operatively connected to said system processor and in fluid communication with said air blower having an open position and a closed position;

a remote control operably connected to said system processor for selecting and displaying a desired fullness requested by a user;

means for receiving said selected desired fullness from said remote control to said system processor;

means for selecting a motor speed from an array of indexed motor speed and operating the air blower at said motor speed; means for opening said valve assembly;

means for checking a present fullness of the air chamber and comparing said present fullness with said desired fullness;

means for stopping said air blower and closing said valve assembly when said present fullness is within a predetermined tolerance of said desired fullness;

means for calculating a motor speed adjustment valve based upon a delta value equal to the difference between said desired fullness and said present fullness; and, means for adjusting said selected motor speed by said motor speed adjustment value.

21. In a method for controlling the fullness of an air mattress having at least one inflatable chamber and a means for generating a pressurized flow of air to the chamber through a supply port, the supply port including a valve for admitting and removing air from said chamber and the chamber including a pressure sensor for measuring chamber fullness, the improvement comprising the steps of:

a) providing a multi-speed air blower as the means for generating pressurized air flow, the operating speed of said blower being selected from an array of discrete, incremented blower speeds, said speeds in said array being a predetermined function of chamber size and time to reach a designated percentage of fullness;

b) selecting a target value of percentage of fullness;

c) comparing the target value with the initial level of chamber fullness measured by said sensor and determining the differential percentage;

d) selecting a blower speed from said predetermined array speeds corresponding to said differential percentage;

e) operating the blower at said selected speed;

f) opening said valve to introduce pressurized air into said chamber through said valve;

g) again determining the percentage of fullness measured by said sensor and determining a new differential percentage;

h) selecting a new blower speed based on the new differential and operating the blower at the new speed to introduce air into the chamber;

i) repeating steps g) and h) until said target value is substantially reached whereupon said value is closed.

22. The method of claim 21 including the steps of:

providing a system processor having a computer readable medium;

including said array of blowers speeds in said computer readable medium whereby said processor determines said blower speed in response to selections of target fullness values.

* * * * *